United States Patent [19]
Choi

[11] Patent Number: 5,811,758
[45] Date of Patent: Sep. 22, 1998

[54] UNDER FLOOR HEATING SYSTEM OF A HEAT ACCUMULATING TYPE AND A METHOD FOR STORING THERMAL ENERGY

[76] Inventor: Young Taik Choi, 292-52, Imoon-Dong, Tongdaemoon-ku Seoul, Rep. of Korea

[21] Appl. No.: 526,882

[22] Filed: Sep. 12, 1995

[30] Foreign Application Priority Data

Sep. 16, 1994 [KR] Rep. of Korea .................. 1994-23703

[51] Int. Cl.⁶ ...................................................... H05B 3/26
[52] U.S. Cl. .......................... 219/213; 219/528; 392/339; 454/185
[58] Field of Search .................................... 219/213, 212, 219/528, 541; 237/69; 454/185, 236, 289; 264/146; 165/53; 392/339

[56] References Cited

U.S. PATENT DOCUMENTS

| | | | |
|---|---|---|---|
| 4,619,801 | 10/1986 | Engel | 264/146 |
| 4,896,831 | 1/1990 | Choi | 237/69 |
| 4,962,884 | 10/1990 | Choi | 237/69 |
| 5,038,850 | 8/1991 | Choi | 165/10 |

*Primary Examiner*—Tu B. Hoang
*Attorney, Agent, or Firm*—Flynn, Thiel, Boutell & Tanis, P.C.

[57] ABSTRACT

A heat accumulating type heating system and a heat energy storing method therefor which include improvements for heat accumulating, heat storage, heat preservation and use of heat by transferring electric power energy into heat energy in order to obtain an improvement for heating effects of the heating system, saving heat energy, and making a comfortable housing environment. The system has panels defining cavities thereon. Each panel is made of a sample heat accumulating material, and has a low heat conductivity (for example, in concrete or stone materials, $0.002 \text{KCalS}^{-1}\text{Cm}^{-1}$ (°C.)). Steam produced by heating water contained in the panel in the initial use is removed through a vent, and heat diffusion and convention in the airtight cavities are smoothly, efficiently achieved. Heat can be generated at night and stored. Stay-on hours of the heater for production of heat energy are reduced and horizontal heat conductance is rapidly diffused by the high heat conductivity of the metal plate molds of the panels. Lower surfaces of each of the metal plate molds for the panels are formed with curved surfaces, which radiate and diffusely reflect heat while diffusion and convection for the radiant heat are obtained.

13 Claims, 4 Drawing Sheets

FIG. 6

UNDER FLOOR HEATING SYSTEM OF A HEAT ACCUMULATING TYPE AND A METHOD FOR STORING THERMAL ENERGY

REFERENCE TO RELATED PATENT

The subject matter disclosed in this application is related to the subject matter disclosed in my U.S. Pat. No. 4,896, 831, issued on Jan. 30, 1990 (U.S. Ser. No. 07/220,001, filed Jul. 15, 1988), my U.S. Pat. No. 4,962,884 issued on Oct. 16, 1990 (U.S. Ser. No. 07/400,555 filed Aug. 30, 1989) and my U.S. Pat. No. 5,038,850, issued on Aug. 13, 1991 (U.S. Ser. No. 07/612,826 filed Nov. 13, 1990), the disclosures of which are to be incorporated herein by reference to show the present state of the art.

FIELD OF THE INVENTION

The present invention relates to a heat accumulating type double heating system, a method for heating the same and a method for storing heat energy.

BACKGROUND OF THE INVENTION

Still more particular, the invention relates to a double underfloor heating system, and a manufacturing and operation method for the heating system.

By use of inexpensive nighttime generated electric power, expensively, much heat (heat energy) is regenerated heat and the underfloor is heated by radiating the heat accumulated kept to a long time even after the power is cut off.

In general, the existing heating method is a method in which combustion heat is produced from boilers or a similar heat source device in an outer part of a room or heating required room, and heat energy is transferred and radiated with a heat transfer media such as water, vapor and air through pipes and ducts into the room.

Therefore, heat loss was much produced from the heat source and heat carrying source, and the accompanying facilities are complex. Kinds and amount on materials are much required.

Also, materials, labour, working cost and working periods are high and the resulting cost for constructing the facility is high. The life time is short and maintenance cost is much required.

Further, the environment is degraded by oxygen breakage, combustion gas discharge and waste production according to the combustion type fuel used, and the preferred heating effect is difficult to obtain.

In particular, boiling water-circulation piping type heating is problematic for achieving a comfortable housing environment due to complex working, frozen breakage, water leakage, fire, explosion, gas poisoning and lower heat efficiency and short life and the like.

There are my Korean Patent Nos. 39472 and 47436, my U.S. Pat. Nos. 4,896,831 and 4,962,884, and my German Pat. Nos. 3926927 which disclose technology for heating by using accumulated heat, energy storing and effecting a radiant form of heat energy transference from nighttime generated electric power.

According to the test results on a heating system of the above-mentioned invention (carried out by National Industrial Technical Institute), when the outer temperature is from −3° C. to −16° C. in 24 hours, there are shown heating effects which is maintained at 23° C. as a room temperature for 24 hours including hours not to be supplied by the nighttime generated electric power, by heating only for 8 hours with the supply from the nighttime generated electric power (applied electric power amount 50 KWH per 5.5 Pyung:19.25 m²).

The amount of applied electric power in such a state is reduced 60% and even when 20 KWH of electric power is used, the same temperature is maintained for 24 hours.

Accordingly, the evidence has shown excellent energy saving effects.

However, there are yet many problems due to hours and labour being required caused by complex procedures for manufacturing members of the double heating system, transportation procedures to the construction site from the manufacturing place, manual operation for working the multi-stage procedures, and the high costs of working the double heating system for many years.

The objects of the present invention are to solve and overcome above listed problems, and in particular to provide a heat accumulating type double heating system, a heating method therefor and a heat energy storing method therefor which apply the technology for heat accumulating, heat storing, heat preservation and use of heat by transferring electric power energy into heat energy, in order to obtain an improved heating effect on the double heating system, improved compact strength of the panels and making comfortable housing environment.

SUMMARY OF THE INVENTION

In the double (or triple) underfloor heating system according to the present invention, panels of heat accumulating materials comprise simple materials, and have lower heat conductivity (for example, in concrete or stone material $0.002 KCalS^{-1}Cm^{-1}(°C.)$). Steamer phenomenon which is produced vapor by heating water contained in the panels in the initial use time is removed by the panels, and heat diffusion and convection in the airtight cavites are smoothly accomplished.

Heat energy, which is partially produced at high temperature by occurring local overheat in the initial use just on the upper part of the electric heater as a heat source, is rapidly radiated on the heating system, accumulated heat and stored heat energy.

The number of hours for heat accumulating and heat energy storing are reduced. Horizontal heat conductance is rapidly diffused by high heat conductivity of the metal plate molds.

Lower surfaces of the lower metal plate molds for the panels are formed with curved surfaces, and effects for radiant and diffused reflection are accomplished whereby ideal diffusion and smooth convection for the radiant heat are obtained.

BREIF DESCRIPTION OF THE DRAWINGS

An explanation of my invention will be given hereunder according to drawings attached hereto, in which.

DETAILED DESCRIPTION

Figure 5:
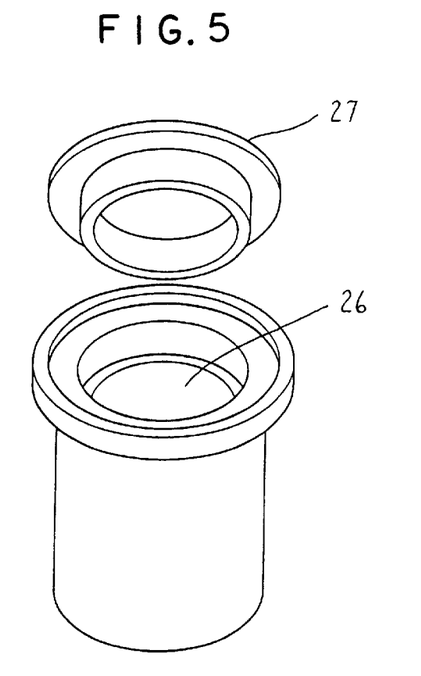
FIG. 5 is an exploded perspective view of an air vent and open-closed means of the first embodiment of the present invention shown in FIG. 2.
Figure 6:
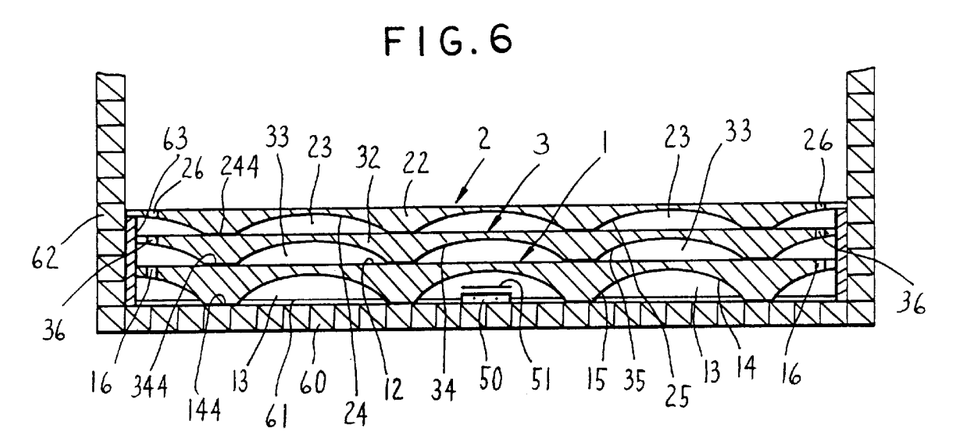
FIG. 6 is a sectional view of a second embodiment of the underfloor heating system of the present invention.

FIGS. 1 to 5 show one embodiment of the invention, and FIG. 6 another embodiment of the invention.

In the drawings of FIGS. 1 to 5, on a concrete base floor 60 a reflecting plate of aluminum foil 61 is put down, and on the inside of the outer walls 62 adiabatic layers 63 are formed. An electric heater 50, as a noncombustible heat source having a rated capacity, is positioned on the reflection plate 61. The electric heater 50 has a heat homogenizing plate 51. The electric heater 50, is arranged with a cross type or a parallel type and the heater 51 is connected to a distributing box breaker 40 with conductive lines adapted to be individually operated.

On the upper surface of the reflecting plate 61, one or a plurality of lower panels 12 and metal plate molds 14 are supported on legs 15 and have grooved portions 144 which form continuous downwardly opening airtight cavities 13 are formed by the legs 15.

The lower panels 12, which are formed from cured and solidified heat accumulating materials, are formed on the upper part of the lower metal plate molds 14.

Heat rising holes 16 are installed on the molds 14 and lower panels 12 to form a lower heating system 1.

On the upper surface of the lower heating system 1, one or a plurality of upper 24, which are formed metal plate molds 24, which are formed legs 25 and have grooved portion 244 which form continuous upper panels 22 and airtight cavities 23 between the legs 25.

The upper panels 22, which are formed from cured and solidified heat accumulating materials, are formed on the upper part of said upper metal plate molds 24.

The upper heating system 2 is formed by the molds 24 and the panels 22. Air vents 26, with an open-closed means 27, are disposed at a position corresponding to the heat rising hole 16, and the upper and lower heating systems 2 and 1 are duplicately formed.

The invention is to provide a heat accumulating type electric double underfloor heating system, a method for heating the same and a method for storing heat energy to be heated, accumulated heat and radiated by forming duplicate upper and lower underfloor heating systems 2 and 1.

The working order for the double underfloor heating system, according to the invention will be described in greater detail below.

Figure 1:
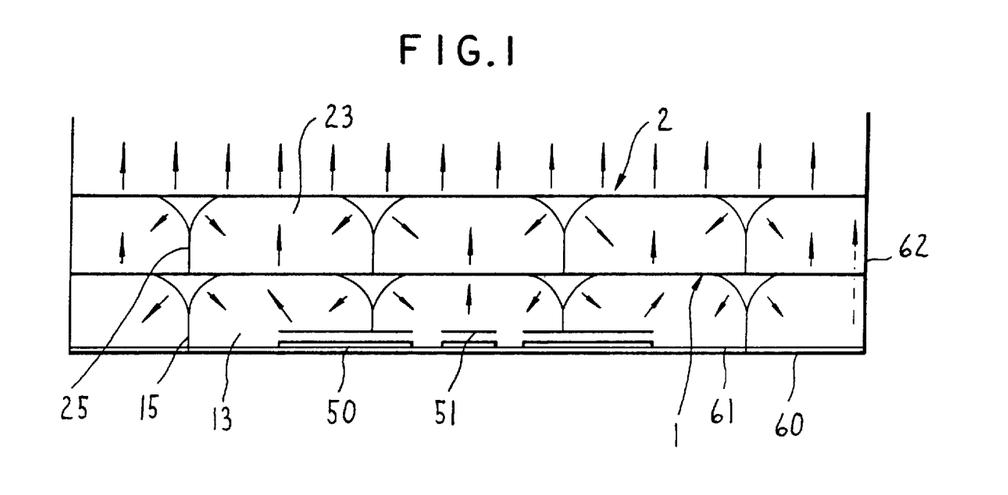
FIG. 1 is a detailed view diagrammatically showing the principle of a first embodiment of the underfloor heating system of the present invention.
Figure 2:
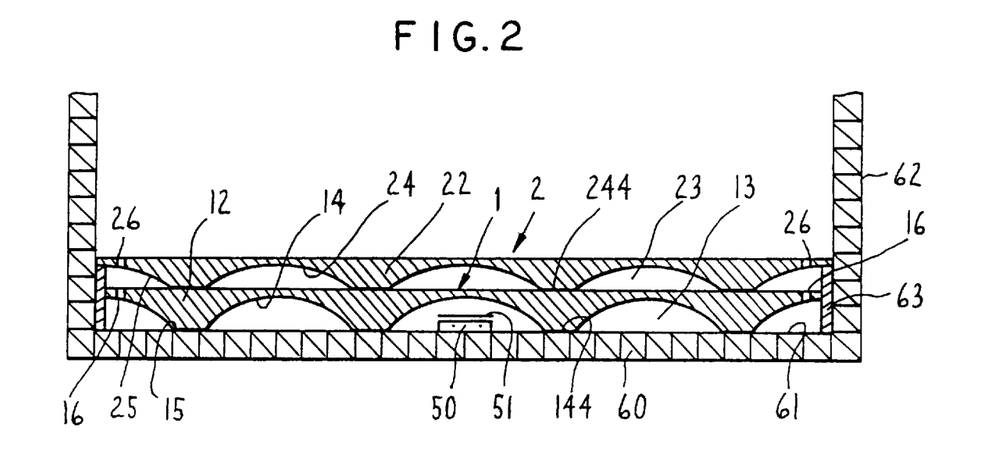
FIG. 2 is a sectional view of a first embodiment of the underfloor heating system dipicted in FIG. 1.

Firstly, the aluminum foil-reflecting plate 61 is put down on the concrete floor 60. The electric heater 50, which is a heat homogenizing plate 51 and which is formed with a cross type and a parallel type orientation on the plate 61, is connected to the distributing box breaker 40 by the conduction lines adapted to be individually operated.

Then, on the upper part of the aluminum foil reflecting plate 61, one or a plurality of lower metal plate molds 14 are installed to form the lower downwardly opening airtight cavities 13 between legs 15 adjacent the groove portion 144.

Next kneading heat accumulating materials to the proper thickness on the lower metal plate molds 14 is performed to form the lower panels 12.

And then heat rising holes 16 are installed on the corner parts to form a lower heating system 1.

After forming a floor for said lower heating system 1, one or a plurality of upper metal plate molds 24 are installed to form the upper downwardly opening airtight cavities 23. Next, kneading heat accumulating materials to the proper thickness on the upper part of the upper metal plate molds 24 is performed to form the upper panels 22.

Airvents 26 with an open-closed means 27 are installed on the corner parts. By such formation of the above members, a upper heating system 2 is formed. By such overall formation, a double heating system is formed.

The operation of the double underfloor heating system according to the invention will be described in greater detail below.

The metal plate has a conductivity of $0.012 KCalS^{-1}Cm^{-1}(°C.)$ as an excellent heat conductor, comparing it with the concrete as a heat accumulating material.

The electric heater 50 radiate heat at about 1200° C. The heat is transferred to the outer pipes and insulated coating materials (MgO) in intimate contact with the radiating lines.

Accordingly, heat of the heater 50 is transferred and heated to the heat homogenizing plate 51.

Far infrared rays and radiant heat are ejected through the heated electric heater 50 and the heat homogenizing plate 51, and air contacted with the heater 50 and the plate 51 is heated and convected.

Accordingly, air in the lower airtight cavity 13 is heated and conducted to the lower metal plate molds 14. And then the molds 14 are heated.

The heated lower metal plate molds 14 are formed by metal plates having high heat conductivity, and horizontally conduct and diffuse heat to the other metal plate molds with rapid speed.

Figure 3A:
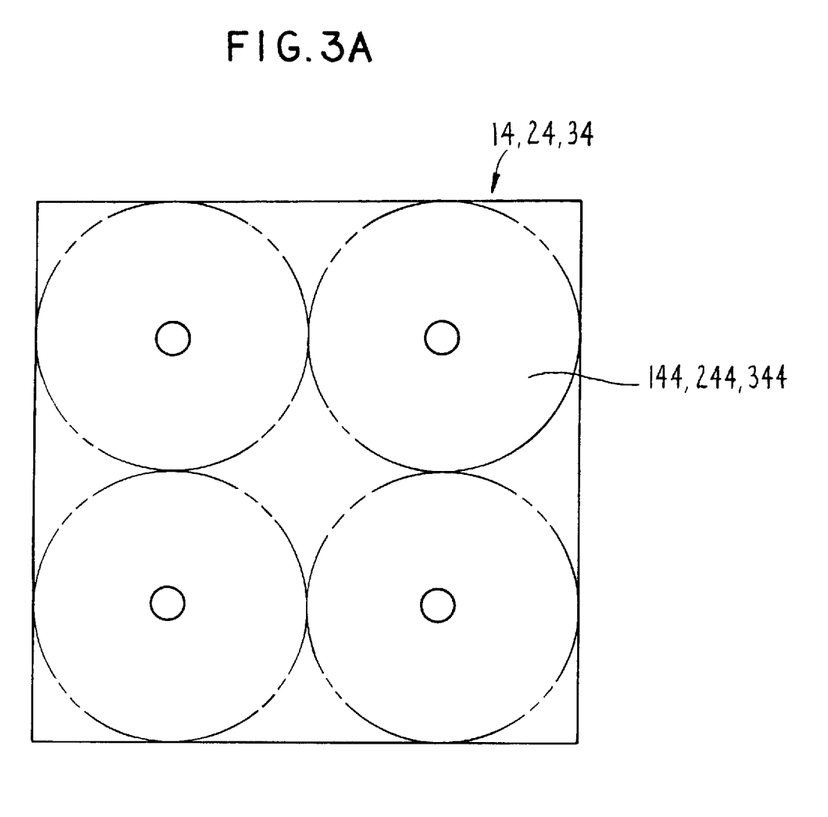
FIGS. 3(A) and 3(B) are shown metallic moldings according to the present invention, wherein FIG. 3 (A) is a plan view and FIG. 3 (B) is a sectional view.
Figure 3B:
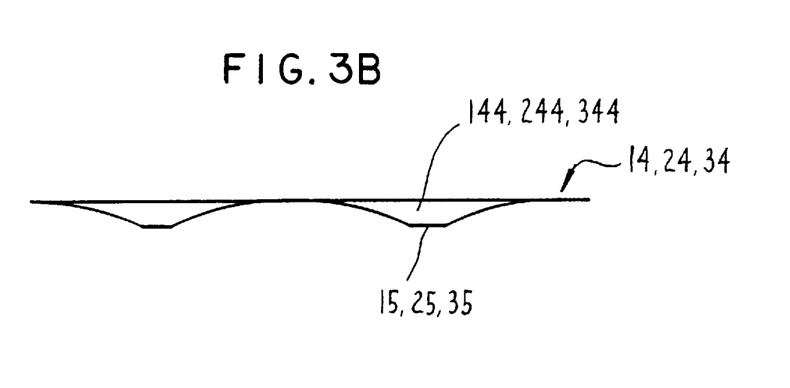
Figure 4:
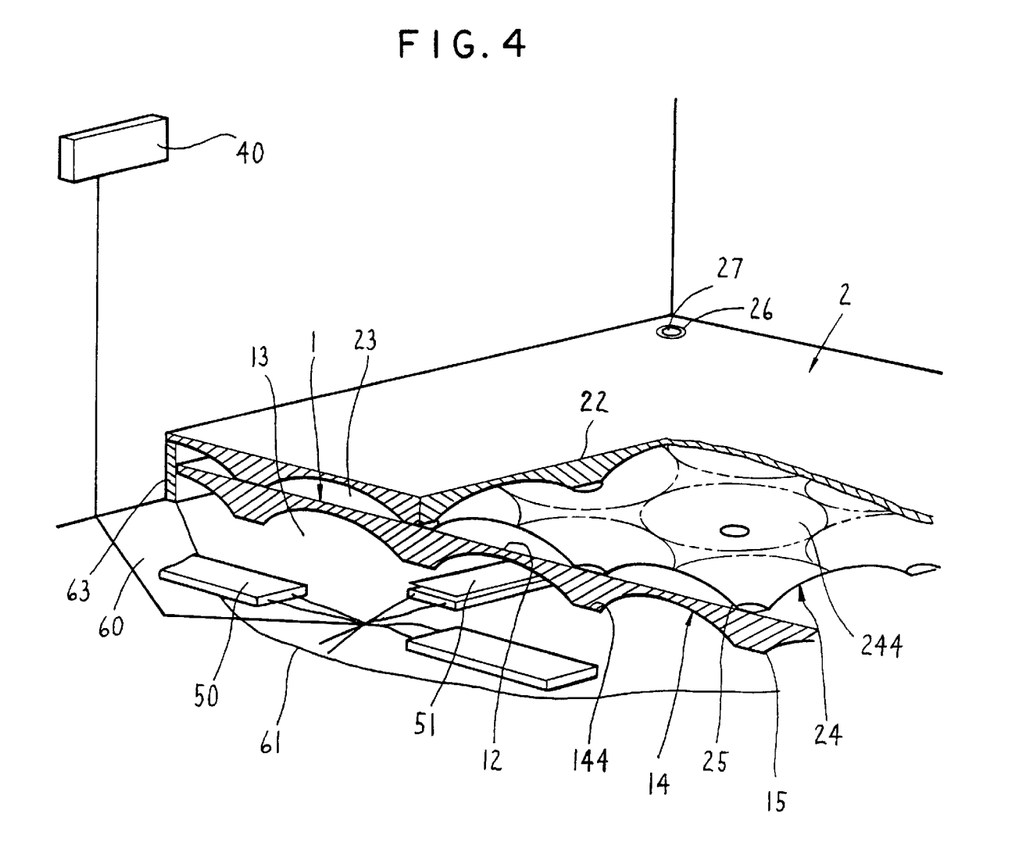
FIG. 4 is a partial cutaway perspective view of the first embodiment of the underfloor heating system of the present invention.

In addition, the lower surfaces of the lower metal plate molds 14 are formed with curved surfaces formed in the groove portion 144 to be diffusedly reflected radiant heat and reflected heat and transfer 60% of said heat energy. Accordingly, the radiant heat and reflecting heat are diffusedly reflected, and energy moving directions are formed with many types. Thus the amount of, diffusion and surfaces area for the radiant heat are increased.

By heat to be conducted and diffused by the lower metal plate molds 14, the lower panels 12 as solid, heat accumulating materials in intimate contact with the molds 14 is heated, conducted and accumulated heat, and stored energy. At the same time heat accumulating areas of the lowr heating system 1 are extended.

In addition, lower surfaces of the upper metal plate molds 24 are formed with curved surfaces in the groove portion 244 to be diffusedly reflected radiant heat and reflecting heat transferring 60% of the heat energy whereby the radiant heat and reflecting heat are diffusedly reflected and energy moving directions are formed with various types, and the amount of diffusion and surface areas for the radiant heat are increased.

Further, together with the streamline curved surfaces of the lower surfaces for the upper metal molds 24 and the upper surface of the lower heating system 1 as air convection surfaces by the temperature difference formed within the upper airtight cavity 23, the convection speed within the upper airtight cavity 23 is more speedily and smoothly formed, and heat moving speed and areas are increased whereby the upper heating system 2 accumulates heat and stored energy.

Accordingly, the upper surface of the upper heating system 2 is radiated and air in the room is heated. The room temperature is constantly maintained. By the conduction of the upper panel 22 heating is directly obtained.

At this time, in order to remove moisture produced within the upper and lower airtight cavities 23 and 13 in the initial use, vapor produced by heating in the lower airtight cavity 13 is rises upwardly into the upper airtight cavity 23 through the heat rising hole 16. Vapor produced in the upper airtight cavity 23 and the vapor rising from the lower airtight cavity 13 can be externally ejected by opening the open-closed means 27 of the airvent 26.

Accordingly, in the heating system according to the invention, when by application of nighttime generated electric power, heat is produced by heating of the heater 50 which is arranged in the lower airtight cavity 13, air in contact with the heater 50 is heated and the heated air rises to the heat plate 51.

That is, the heat homogenizing plate 51 and the surrounding air therefor are heated, and the lower metal plate mold 14 of the lower heating system 1 is heated by the heated air and heat of the heat homogenizing plate 51, and the heated lower metal plate mold 14 is heated the lower metal plate molds 14 which are continuously conducted with rapid speed by the excellent heat conductance.

Further, radiant heat having about 60% of the heat produced from the electric heater 50 is radiated to the lower metal plate mold 14 formed with the curved surface on the lower surface of the mold 14, together with heat which is partially reflected from the heat homogenizing plate 61 and with radiant heat from the heat homogenizing plate 51, and then said lower metal plate mold 14 is heated.

Partial radiant heat is reduced formation of high temperature on just the upper part of the heater 50 by the heat which is radiated and reflected again on the aluminum foil reflecting plate 61, that is, radiant heat which is diffusedly reflected between the Al foil reflecting plate 61 put down on the concreate floor 60 and the lower metal plate mold 14.

At the same time, the continuously connected lower metal plate molds 14 are heated and air in the lower airtight cavity 13 is heated. Even air in the corner part which has no installation of the heater 50 has heat to it and air in the lower metal plate mold 14 and the lower airtight cavity 13 is heated.

Thus, heat is conducted to the lower panel 12 in intimate contact with the lower metal plate mold 14.

Finally, the lower panel 12 is heated to provide a source of accumulated heat.

The lower heating system 1 which is heated to provide a source of accumulated heat as described above radiates heat from the upper surface of the lower panel 12. The radiated heat is contacted with air again, and the contacted air is heated in the upper airtight cavity by convection, and at the same time heat in the upper metal plate mold 24 contacted with this air.

By such heating, the upper metal plate mold 24 which has excellent heat conductivity is heated and at the same time air in the upper airtight cavity 23 is heated.

Even air in the corner parts is convected and air in the upper metal plate mold 24 and the upper airtight cavity 23 is heated.

Therefore, heat is conducted to the upper panel 22 in intimate contact with the upper metal plate mold 24, and heating and heat accumulating are made.

By such heating and heat accumulating, on the surface of the upper heating system 2, that is, on the surface of the upper panel 22 uniform temperature distribution is formed.

Thus, if heat in the room is lost and air in the room is cooled, the heat is supplemented by the temperature difference so as to not lowered the indoor temperature on all the surface of the upper panel 22 for the upper heating system 2, and the indoor temperature is constantly maintained.

At this time, the heat which is stored from the upper panel 22 of the upper heating system 2, is radiated and heat of the upper airtight cavity 23 is absorbed through the upper metal plate mold 24 by the temperature difference of the upper panel 22, and storing temperature of the upper panel 22 is constantly maintained.

Also, in the upper airtight cavity 23 deprived of heat, with radiant heat, the absorbed heat of the lower panel 12 for the lower heating system 1 is conveyed by convection, and the temperature is maintained.

At the same time heat which is stored on the lower panel 12 is radiated into the upper airtight cavity 23. In order to keep states which are not cooled heat from the lower panel 12 and the lower airtight cavity 13, power supply hours and heat amount are controlled well to be reaccumulated heat by the nighttime generated electric power.

Therefore, radiation (about 1200° C., as high radiating temperature) from radiating lines for the electric heater 50 are passed by the multistage-heat transfer processes.

Such as a process which is passed insulated coating material (MgO) of the lines, outer pipes and the heat homogenizing plate 51, a process which is passed through air in the upper airtight cavity 23, the upper metal plate mold 24 and the upper panels 22 etc., and a process which is passed through air in the lower airtight cavity 13, the lower metal plate mold 14 and the lower panel 12.

By passage of the heat transfer, heat transfer functions for radiation, convection and conduction are well controlled is reduced and the room temperature is obtained as a desired, proper temperature.

Stay hours for the produced heat energy in the double heating system are long and by re-accumulating heat from the nighttime generated electric power, the double heating system accumulates heat. Large heating loads can be sufficiently tolerated in the very cold season.

Also, when the room temperature is lowered by abruptly lowering the outer temperature, radiant speed is rapid by the temperature difference on the surface of the upper heating system and radiant amount on all the surface is much.

Accordingly, proper temperature is maintained.

The panels are composed of auxiliary accumulating heat materials in order to supply accumulating heat with a fixed amount of the material (see U.S. Pat. No. 4,962,884).

However, the invention has no the auxiliary accumulating heat materials, and has upper and lower panels 22 and 12, of which the thickness can be randomly increased and decreased whereby the heating load can be allowed and controlled.

Further, conduction and convection for the heat energy are operated in the same way to the lower heating system 1 and the upper panel 2.

Heat exchange and convection are naturally and continuously accomplished until the temperature difference between the heating system's components is fully removed between the upper heating system 2 and the lower heating system 1 and between the upper airtight cavity 23 and the lower airtight cavity 13, without having any seasons of heating and non-heating and any hours of heating and non-heating.

Another embodiment of the invention will be described below according to FIG. 6.

In FIG. 6, the same components in FIGS. 1 to 5 have same reference numerals and details therefore are omitted.

Between the upper heating system 2 and the lower heating system 1, on the upper part of the lower system 1, one or a plurality of middle metal plate molds 34 are supported on leg 35 and have a groove portion 345 continuously disposed, and a middle airtight cavity 33 between the legs 35. On the upper part of the middle metal plate mold 34, kneading accumulating heat materials are cured to a proper thickness and a middle panel 32 is formed. On the middle panel 32, a heat rising hole 36 is disposed in the position corresponding to the heat rising hole 16 of the lower heating system 1 so that a middle heating system 3 is formed.

Operation for the embodiment of the invention in, which is disposed the middle heating systems between the upper heating system 2 and the lower heating system 1 as described above, will be explained below.

The heater 50, which is installed in the lower airtight cavity 13, is heated by application of the nighttime generated electric power, and heat is produced.

By the produced heat, air contacted with the heater 50 is heated, and the heated air is cause to rise by the heat homogenizing plate 51 and is heated. That is, air of the plate 51 and surrounding air thereof are heated.

The heated air and heat of the plate 51 are heated to heat the lower metal plate mold 14 of the system 1, and the heated mold 14 is heated with rapid speed by excellent heat conductivity.

In addition, radiant heat having about 60% of heat produced from the heater 50 is radiated to the lower mold 14 which is formed with a curved surface on the lower surface thereof, together with heat which is partially reflected from the heat plate 51 and reflected again from the aluminum foil reflecting plate 61 and with radiant heat from the heat plate 51. And then the lower mold 14 is heated. Partial radiant heat is reduced local formation of high temperature on just the upper portion of the heater 50 with the radiant heat which is radiated again and reflected again on the aluminum foil plate 61, that is, the radiant which is diffusedly reflected between the lower mold 14 and the aluminum foil plate 61 put down on the concreate floor 60.

At the same time, continuously connected molds 14 are heated and air in the lower airtight cavity 13 is heated.

And then even air in the corner part in which there is no installed heater 50 is convected and air in the mold 14 and the lower cavity 13 is heated. Therefore, to the lower panel 12 in intimate contact with the lower mold 14, heat is conducted and accumulated. Finally heat energy is stored.

The lower heating system 1 in which heat is accumulated as described above is radiates the radiant heat on the upper surface of the lower panel 12, and the radiant heat is contacted with the air again. And then the contacted air is heated so that the air in the middle airtight cavity 33 is heated by convection, and the middle metal plate mold 34 contacted with the air so that is heated whereby the continuously connected upper metal plate mold 34 having excellent heat conductivity is heated and air in the middle airtight cavity 33 is heated.

Further, even air in the corner part is convected and air in the middle mold 34 and the middle cavity 33 is heated.

Thus, to the middle panel 32 in the intimate contact with middle metal plate mold 34, heat is conducted and accumulated. Finally heat energy is stored.

The middle heating system 3 which is heated and accumulates heat as described above radiates heat on the surface of the middle panel 32 and the radiated heat is contacted with air.

The contacted air heats the air in the upper airtight cavity 23 by convection and at the same time the upper metal plate mold 24 contacted with the air is heated whereby the continuously connected mold 24 having excellent heat conductivity is heated and air in the upper airtight cavity 23 is heated.

And then even air in the corner part is convected and air in the upper metal plate mold 24 and the upper airtight cavity 23 is heated.

Therefore, to the upper panel 22 in intimate contact with the upper mold 24 heat is conducted. Finally heating and accumulated heat are carried out.

And then, on the surface of the upper heating system 2, that is, on the surface of the upper panel 22 is formed a uniform temperature distribution.

Accordingly, when the room air is cooled after depriving of heat from the heated air in the room, heat is supplied by the temperature difference so as to not lower the room temperature on the surface of upper part of the upper panel 22 in the upper heating system 2, and the room temperature is continuously maintained.

At this time, heat stored from the upper panel 22 of the upper heating system 2 is radiated and heat in the upper metal plate mold 24 by the temperature difference of the upper panel 22, and the stored temperature of the upper panel 22 is continuously maintained.

In addition, in the upper airtight cavity 23 deprived of heat, radiant heat and air are absorbed in the middle panel 32 of the middle heating system 3 by convection and radiant energy, and the temperature itself is maintained.

At the same time, heat stored from the middle panel 32 is radiated to the upper airtight cavity 32 and heat in the middle airtight cavity 33 is absorbed through the middle metal plate mold 34 by the temperature difference of the middle panel 32, and the temperature of stored heat from the middle panel 32 is constantly maintained.

Further, in the middle airtight cavity 33 deprived of heat, radiant heat and air are absorbed by the lower panel 12 of the lower heating system 1 by convection and radiant energy, and the temperature itself is maintained. At the same time, heat stored from the lower panel 12 is radiated to the middle airtight cavity 33.

Heat from the lower panel 12 and the lower airtight cavity 13 is maintained the states which are not cooled, and supply hours are controlled so that heat is reaccumulated heat by the nighttime generated electric power.

Therefore, heat from the radiating line of the heater 50 is passed through the multistage heat transfer processes such as the process which is passed insulated coating materials (MgO) of the radiating line having about 1200° C. of high temperature and outer pipes as well as a heat homogenizing plate 51, the process which is passed through air in the lower airtight cavity 13, the lower metal plate mold 14 and the lower panel 12, the process which is passed through air in the middle airtight cavity 33, the middle metal plate mold 34 and the middle panel 32, and the process which is passed through air in the upper airtight cavity 23, the upper metal plate mold 24 and the upper panel 22. And then heat transfer operations such as radiant, conductance and convection are well controlled naturally and in combination.

The high temperature heat has the desired room temperature heat, and hours which the produced heat energy remains within the triple heating system are longer.

The heating load in general time is permitted by the reaccumulation of heat through application of the nighttime generated electric power every day, and the triple heating system is much accumulated heat, and in the very cold area of −50° C. heating can be carried out only by the nighttime generated electric power.

When heat energy in the room is deprived by an abrupt lowering of the outer temperature and the room temperature consequently lowered, radiant temperature becomes rapid by the temperature difference on the surface of the upper heating system 2 and radiant amount on the surfaces is much produced. Finally, proper room temperature is maintained.

The present invention has simple structures and very simple working, no heat loss due to accumulating heat and permanent structures.

Further, the invention has effective heating in very cold area (−50° C.) and no discharge for oxygen degredation due to combustion, and wastes of fuel, and discharge of combustion gas ($CO_2$ gas).

In addition, the invention has no loss in heat transfer and heat movement because fire, explosion and electrowave are cut off doubly and triply, and radiating (ejection) heat can be safely carried out in the heating place.

Accordingly, the invention is useful in making comfortable the housing environment by providing an excellent heat accumulating type double or triple heating system, a heating method therefor and a heat energy storing method

What is claimed is:

1. In a closed type heat accumulating underfloor heating system, to accumulate heat and to radiate the accumulated heat into a room to be heated, the improvement comprising;
   a support surface;
   outer walls extending upwardly from the support surface;
   an aluminum foil reflecting plate covering the support surface for reflecting heat upwardly, adiabatic layers covering the outer walls, a means for heating being disposed on the aluminum foil reflecting plate;
   a lower heating system member including at least one lower metal plate mold being supported on first legs extending from the lower metal plate mold to the aluminum foil reflecting plate, a lower groove portion being formed in a lower surface of the lower metal plate mold and being positioned between the first legs, a continuous lower cavity being formed by said lower metal plate mold and the first legs, the lower metal plate mold being made of cured heat accumulating materials provided on an upper part of the groove portion and a remainder portion of the lower metal plate mold, and at least one heat transfer hole being provided in the lower metal plate mold; and
   an upper heating system member including at least one upper metal plate mold being supported on second legs extending from the upper metal plate mold to an upper surface of the lower metal plate mold, an upper groove portion being formed in a lower surface of the upper metal plate mold and being positioned between the second legs of the upper metal plate mold, the upper plate mold and the second legs forming a continuous upper cavity, a portion of the upper metal plate mold being made of cured heat accumulating materials provided on an upper part of the groove portion of the upper metal plate mold and a remainder portion of the upper metal plate mold, and an airvent including an opening-closing means being disposed in the upper metal plate mold, the airvent being positioned above one of the heat rising holes, said upper and lower cavities being airtight when said airvent is closed by said opening-closing means.

2. The underfloor heating system according to claim 1, wherein said heating means includes a plurality of noncombustion heating units, said plurality of heating units being arranged on said foil reflecting plate in first and second orientations, said first orientation having said heating units arranged parallel to each other, said second orientation having said heating units arranged perpendicular to said first orientation, and a control box for operating said plurality of heating units.

3. The underfloor heating system according to claim 2, wherein a middle heating system member is provided between the upper heating system and the lower heating system members, and wherein the middle heating system member includes at least one middle metal plate mold having third legs separated by a groove portion, the middle metal plate mold and the third legs forming a continuous middle cavity, an upper part of the middle metal plate mold including heat accumulating material, a heat rising hole being disposed in the middle panel in a position corresponding to the heat rising hole of the lower panel.

4. The underfloor heating system according to claim 1, wherein the respective groove portions of the upper and lower plate molds have a curved lower surface for improving heat reflection and transfer of heat energy within the upper and lower cavities.

5. A method for heating a heat accumulating type underfloor heating system, comprising the steps of positioning a foil heat reflecting member on a concrete support floor, forming adiabatic layers on the outer walls, positioning an electric heater having a heat homogenizing plate on the foil heat reflecting member, connecting an electric heater through electrically conductive lines adapted to be operated individually by connection to a distributing control box, reflecting heat generated by the electric heater off the foil heat reflecting member;
   disposing at least one lower metal plate mold on first legs separated by a groove portion to form a continuous lower cavity, making a lower panel from cured heat accumulating materials on an upper part of the groove portion of the lower metal plate mold, placing a heat rising hole in the lower panel to form a lower heating system;
   disposing at least one upper metal plate mold on second legs separated by a groove portion to form a continuous upper cavity, forming an upper panel from cured heat accumulating materials on an upper part of the upper plate mold, disposing a closable airvent in the upper part of the upper plate mold, selectively radiating heat from the heater, reflecting heat by the lower surface of the upper and lower metal plate molds, storing heat in the upper and lower cavities and upper and lower plate molds, and radiating heat from the upper plate mold into the room to be heated.

6. The method according to claim 5, further comprising the steps of positioning at least one middle metal plate mold between the upper and lower plate molds, supporting the middle plate on third legs separated by a groove portion to form a continuous middle cavity, kneading and curing heat accumulating materials to a proper thickness on the upper part of the middle metal plate mold to form a middle panel, disposing a heat rising hole in the middle panel in the position corresponding to the heat rising hole of the lower panel, and the upper metal plate, the middle metal plate and the lower metal plate being a triplicate heating system, and then heating, accumulating heat and radiating energy within the triplicate heating system to heat the room above the heating system.

7. The method according to claim 6, wherein the step of positioning an electric heater includes the steps of orienting a plurality of heating units into one of a first group having a parallel orientation and a second group having a perpendicular orientation relative to the first group, and positioning a heat homogenizing plate above each heating unit.

8. A method for storing energy from a heat accumulating type underfloor heating system comprising a support floor, an aluminum heat reflecting foil covering the support floor, outer walls extending upwardly from the support floor and having adiabatic layers on an inside of the outer walls, a non-combustion heater positioned on the aluminum foil, the heater having one of a cross orientation and a parallel orientation, a heat homogenizing plate positioned on the heater, and electric conductive lines adapted to be operated individually by connection to a distributing breaker box controlling the heater, the steps comprising:

forming at least one lower metal plate mold having first legs separated by a first groove portion and having a lower panel such that an upper part of the first groove and the lower panel are formed from cured heat accumulating material, forming a continuous lower cavity between the lower panel, the first legs and the support floor, placing a heat rising hole in the lower metal plate mold to form a lower heating system;

forming at least one upper metal plate mold having second legs separated by a second groove portion and having an upper panel such that an upper part of the second groove and the upper panel are formed from cured heat accumulating material, forming a continuous upper cavity between the upper panel and the lower panel, disposing an airvent on the upper metal plate mold and the upper panel aligned with a heat rising hole, disposing an open-closed means in the airvent, heating the heating system, reflecting heat energy off the aluminum heat reflecting foil into the lower cavity, accumulating heat in the upper and lower cavities and heat accumulating material, and radiating heat from the upper panel into the room to be heated.

9. The method according to claim 8, further comprising the steps of forming at least one middle metal plate mold having third legs separated by the third groove portion and having a middle panel such that an upper part of the third groove and the middle panel are formed from cured heat accumulating material, forming a continuous middle cavity, curing and kneading the heat accumulating materials to a proper thickness on the middle panel, disposing a heat rising hole in the middle metal plate mold in the position corresponding to the heat rising hole of the lower panel, heating the lower, middle and upper cavities and the heat accumulating materials, accumulating heat in the lower, middle and upper cavities and the heat accumulating material, and radiating heat from the upper panel into the room to be heated.

10. A heating system beneath the floor of a room to be heated, comprises:

a support surface; a heat reflecting foil covering said support surface; outer walls extending upwardly from said support surface, an inside surface of said outer walls having an adiabatic layer; means for generating heat being provided on said heat reflecting foil, said heat reflecting foil reflecting generated heat upwardly away from said support surface; at least one metal lower plate member extending between said outer walls; said lower plate member including first legs and a first panel, said first legs contacting said heat reflecting foil and supporting said first panel vertically spaced from said reflecting foil; a lower cavity extending between said support surface, said outer walls, said first legs and said first panel; a plurality of heat rising holes being positioned in said first panel; at least one metal upper plate member extending between said outer walls and including second legs and a second panel, said second legs supporting said second panel vertically spaced from said first panel; an upper cavity extending between said first panel, said second panel, said outer walls and said second legs; and an airvent being positioned in said second panel above one of said heat rising holes, said airvent including a closing means for selectively opening said airvent to vacate moisture from within said upper and lower cavities, said lower and upper cavities being airtight when said airvent is closed by said closing means, said first and second panels being curvedly connected to respective said first and second legs to improve diffusion of heat within said lower and upper cavities.

11. The heating system according to claim 10, wherein a middle plate member is provided between said lower and upper plate members, said middle plate member including third legs and a third panel, said third legs extending downwardly from said third panel and contacting said lower plate member to support said third panel vertically spaced from said first panel, said upper cavity being divided by said middle plate member into an uppermost cavity and a middle cavity, said middle cavity extending between said third panel, said third legs, said first panel and said outer walls, said third panel being curvedly connected to said third legs to improve diffusion of heat in said middle cavity, and wherein a plurality of heat rising holes are provided in said third panel.

12. The heating system according to claim 11, wherein said second legs extend downwardly from said second panel and contact said middle plate member to support said second panel vertically spaced from said third panel, and said first, second and third panels having heat accumulating materials therein.

13. A method for manufacturing and operating a heating system beneath the floor of a room to be heated, comprising the steps of positioning a heat reflecting member on a support surface, forming adiabatic layers on the outer walls, positioning a non-combustion heater on the heat reflecting member, controlling the heater through electrical connection lines with a distribution control box, reflecting downwardly directed heat from the heater upwardly off the heat reflecting member, forming a lower plate mold and an upper plate mold each having a curved lower surface between adjacent legs from heat accumulating material, placing heat rising holes in the lower plate mold, placing a closable airvent in the upper plate mold for selectively vacating moisture from the heating system, generating heat from the heater, diffusing heat off the curved lower surface of the lower plate, radiating heat through the lower plate, transmitting heat through the heat rising holes, diffusing heat off the lower surface of the upper plate, storing heat in the cavities between the upper and lower plates and the lower plate and support surface, storing heat in the upper and lower plates, and radiating heat from the upper plate into the room to be heated.

* * * * *